United States Patent
Luebeck et al.

(10) Patent No.: US 6,588,638 B1
(45) Date of Patent: Jul. 8, 2003

(54) KEY CONTAINER

(75) Inventors: Jon Marc Luebeck, Stayton, OR (US); Jose I. Vega, Corvallis, OR (US); Mathew Steven Hill, Sublimity, OR (US)

(73) Assignee: GE Interlogix, Inc., Salem, OR (US)

( * ) Notice: Subject to any disclaimer, the term of this patent is extended or adjusted under 35 U.S.C. 154(b) by 0 days.

(21) Appl. No.: 09/776,237

(22) Filed: Feb. 1, 2001

(51) Int. Cl.⁷ .............................................. B60R 11/00
(52) U.S. Cl. ..................... 224/567; 224/279; 224/569; 224/571
(58) Field of Search ................. 224/567, 569, 224/571, 279, 42.14; 70/423, 424, 427, 428, 455

(56) References Cited

U.S. PATENT DOCUMENTS

| | | | |
|---|---|---|---|
| 3,811,563 A | | 5/1974 | Fox, II |
| 4,446,709 A | * | 5/1984 | Steinbach ............... 70/363 |
| 4,498,614 A | * | 2/1985 | Guarr ................. 224/42.14 |
| 4,594,866 A | * | 6/1986 | Neyret ................... 70/455 |
| 4,884,424 A | * | 12/1989 | Meyer ..................... 70/427 |
| 4,917,279 A | * | 4/1990 | Brow et al. ........... 224/42.14 |
| D308,276 S | | 5/1990 | Appelbaum |
| 5,118,017 A | * | 6/1992 | Buck .................. 224/42.13 |
| 5,203,187 A | * | 4/1993 | Kane ..................... 70/455 |
| 5,429,285 A | * | 7/1995 | Kim ................... 224/42.14 |
| 5,657,862 A | | 8/1997 | Burke |
| 5,704,235 A | | 1/1998 | Stähle |

OTHER PUBLICATIONS

HPC, Inc. webpage, www.hpcworld.com/s_kvault.htm (1999).
HPC, Inc. webpage, www.hpcworld.com/s_autokp.htm (1999).
HPC, Inc. webpage, www.hpcworld.com/s_trkkep.htm (1999).

* cited by examiner

Primary Examiner—Stephen K. Cronin
Assistant Examiner—Maerena W. Brevard
(74) Attorney, Agent, or Firm—Klarquist Sparkman, LLP (57) ABSTRACT

A key container mountable to the body of a vehicle includes a body and a removable cover. The body has a forward flanged end and a storage portion that may be inserted through an opening defined in the vehicle body. The flanged end has at least one hole adapted to receive a fastener for mounting the flanged end to the outside surface of the vehicle. An internal chamber for storing keys or other items is defined in the storage portion, and the chamber can be accessed through an access opening defined in the flanged end. The removable cover covers the access opening and the fasteners when the cover is coupled to the flanged end. A locking mechanism is coupled to the cover for locking the cover to the body of the key container at any orientation about its central axis.

35 Claims, 6 Drawing Sheets

KEY CONTAINER

FIELD OF INVENTION

This invention relates to key containers, and in particular, to an improved key container suitable for mounting to the body of a vehicle or to another structure.

BACKGROUND OF THE INVENTION

Key containers are commonly used for storing keys or other items at a desired location. A typical key container comprises a box-like structure having a front cover connected to a storage portion which together define an internal chamber for storing items. The cover includes a conventional locking mechanism, such as a key actuated lock or a combination lock, for keeping the cover closed and locked to the storage portion, thereby securing the contents of the container.

Key containers, which are used in a variety of applications, are especially advantageous for storing vehicle ignition keys. Motor vehicle dealers and valets, for example, often use key containers that are attached to vehicles, e.g., by a hanger that suspends the key container over a window of the vehicle (thus preventing easy theft of the key container). Key containers are also commonly used in the commercial vehicle fleets in which case the key containers are mounted to the vehicles in a more permanent fashion, e.g., with fasteners.

The construction of a conventional key container designed for commercial fleet applications typically comprises a body having a flanged end that is mounted to the outside surface of a vehicle body and a generally cylindrical storage portion that is inserted through an opening defined in the vehicle body. The flanged end has an access opening that is in communication with an internal chamber defined in the storage portion. Conventional fasteners, such as rivets or bolts, are used to secure the flanged end to the vehicle body. A removable cover is provided for covering the access opening when it is mounted to the flanged end. A locking mechanism coupled to the cover engages a corresponding latch on the body of the container to keep the cover closed and locked to the body.

Conventional key containers used in commercial fleet applications suffer from several shortcomings. For example, a conventional key container is susceptible to theft because the fasteners used for mounting the key container to the vehicle are not safeguarded from unauthorized personnel. In addition, existing key containers are somewhat difficult to operate because the locking mechanism must be aligned with a corresponding latch on the key container body in order to lock the cover in place. This may be inconvenient for fleet managers or service personnel who must repeatedly access key containers throughout the workday. Moreover, conventional key containers do not have suitable seals or protective structures to prevent ingress of unwanted substances, such as dirt and moisture, into the internal chamber or the keyway of the locking mechanism.

SUMMARY OF INVENTION

The present invention seeks to overcome problems of the prior art by providing an improved key container.

According to one aspect of the invention, a key container comprises a body having a forward flanged end with an access opening and a storage portion defining an internal chamber in communication with the access opening. The flanged end has at least one hole for receiving a fastener for mounting the flanged end to a vehicle or another structure. A removable cover is provided for covering the access opening and the at least one hole. A locking mechanism is coupled to the cover and operable to lock and unlock the cover to and from the body of the key container.

Thus, a thief seeking access to the contents of the container cannot simply remove it from the vehicle by removing fasteners that mount a container to a vehicle, because the flanged end is inaccessible when the cover is locked to the body. Rather, the thief must defeat the lock while he is at the vehicle, or physically destroy the key container itself or the portion of the vehicle to which it is mounted. If the thief must remain near the vehicle to defeat the key container, which may be in a monitored area, he may be more likely to be observed, or he may decide not to attempt the theft. Moreover, the key container resembles a gas cap when mounted to a vehicle and as such, a thief is less likely to be attached to the container.

In a modification to the embodiment described above, the key container is provided with at least one fastener attached to or formed with the flanged end for mounting the flanged end to a structure and the removable cover is configured to cover the access opening and the exposed end of the fastener. In such a case, the at least one hole in the flanged end for receiving a fastener may be unnecessary.

According to another aspect of the invention, a key container comprises a body having a forward end with an access opening and a storage portion defining an internal chamber in communication with the access opening. A removable cover for mounting to the forward end is configured to cover the access opening and thereby restrict access to the chamber when so mounted. A locking mechanism is coupled to the cover and configured so that the cover may be positioned at any orientation about the central axis of the key container for mounting to the body of the key container. Accordingly, the cover can be mounted and locked in place without the inconvenience of having to first align the locking mechanism with a corresponding latch on the body of the key container. The locking mechanism may comprise an axially projecting lock core defining a locking axis parallel to but laterally offset from the central axis. The lock core is rotatable relative to the cover between a locked position wherein the lock core engages a portion of the body and an unlocked position wherein the lock core disengages from the body.

DETAILED DESCRIPTION

Figures 1, 2:
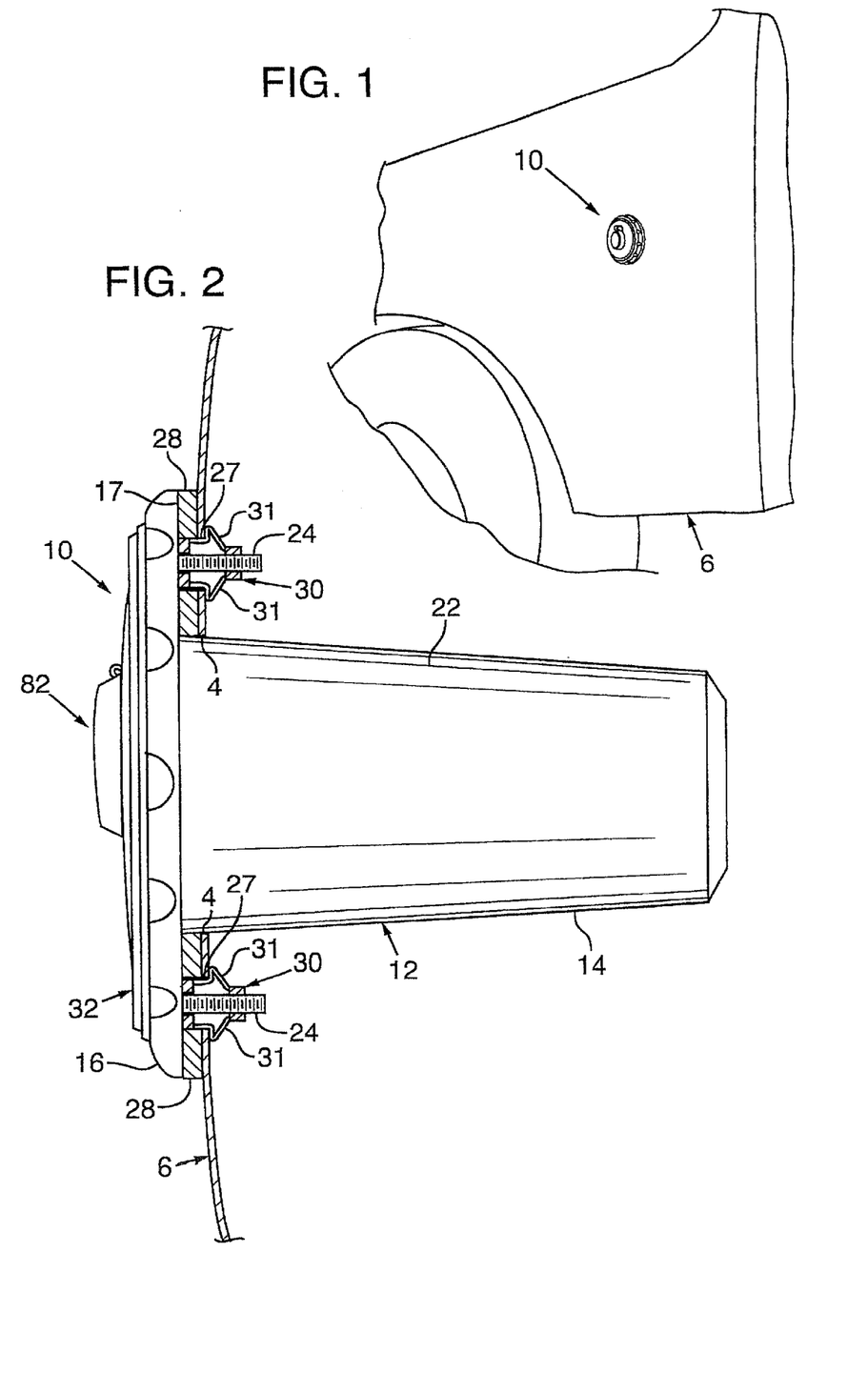
FIG. 1 is a partial perspective view of a side panel of a vehicle to which a key container according to the invention is mounted.
FIG. 2 is an enlarged side view of the key container of FIG. 1 with a portion of the side panel shown in section.
Figure 3:
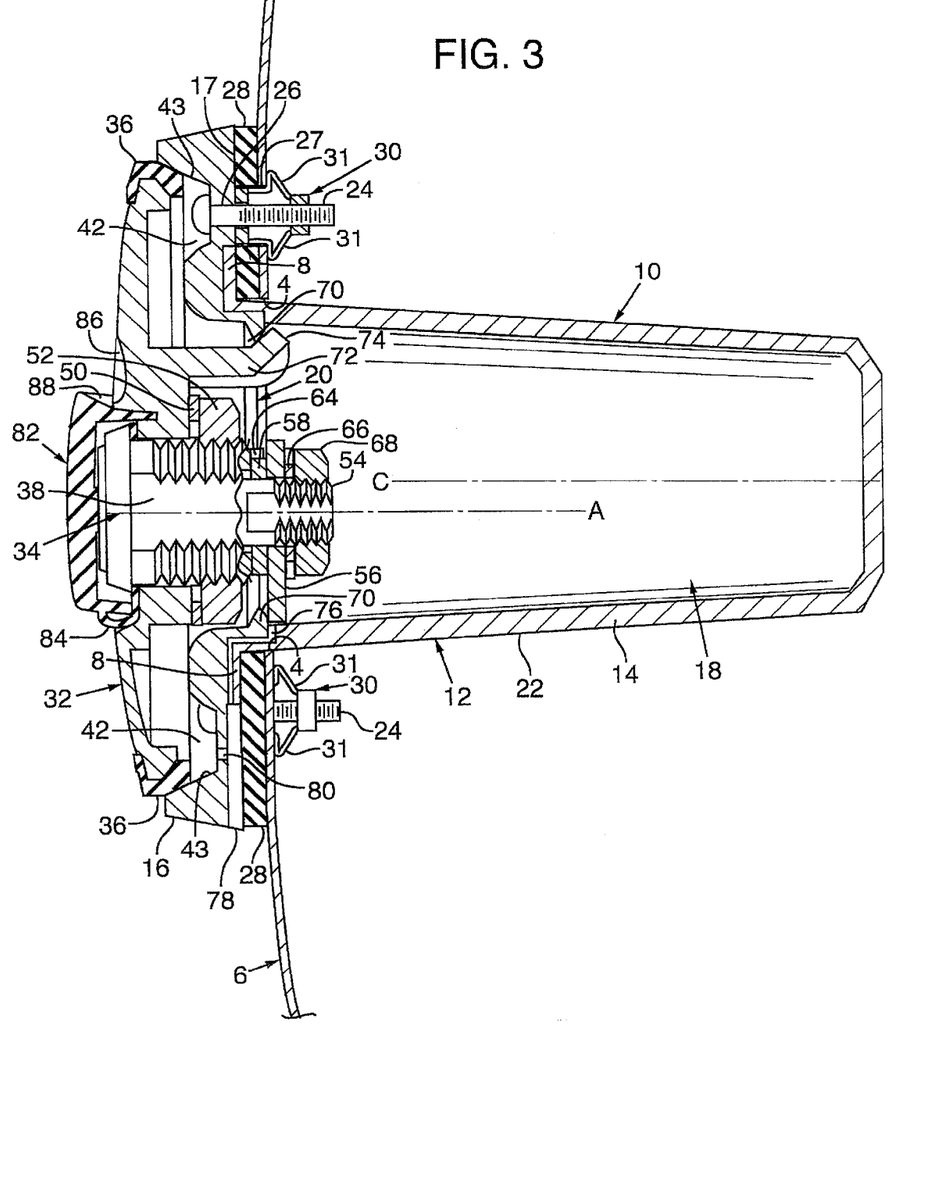
FIG. 3 is an enlarged cross sectional view of the key container of FIG. 2 with the key container also shown in section.

Referring first to FIGS. 1–3, a key container 10 in accordance with the present invention is shown mounted to the side panel 6 of a vehicle. As can be seen in FIGS. 2 and 3, the key container 10 comprises a main body 12 having a hidden storage portion 14 that extends through an opening 4 in the side panel 6 and an exposed flanged end 16 mounted to the outside surface of the side panel 6. In the illustrated implementation, the storage portion 14 of the body 12 is generally frustoconical in shape, and has an outer side wall surface 22 projecting perpendicularly and tapering inwardly from the flanged end 16.

As best shown in FIG. 3, the body 12 is preferably formed by press fitting a radially projecting lip 8 disposed on the open end of the storage portion 14 into a recess defined in a rear surface 17 of the flanged end 16. Alternatively, the storage portion 14 and the flanged end 16 may be interconnected by any other suitable means, such as by conventional fasteners or by welding.

Figure 4:
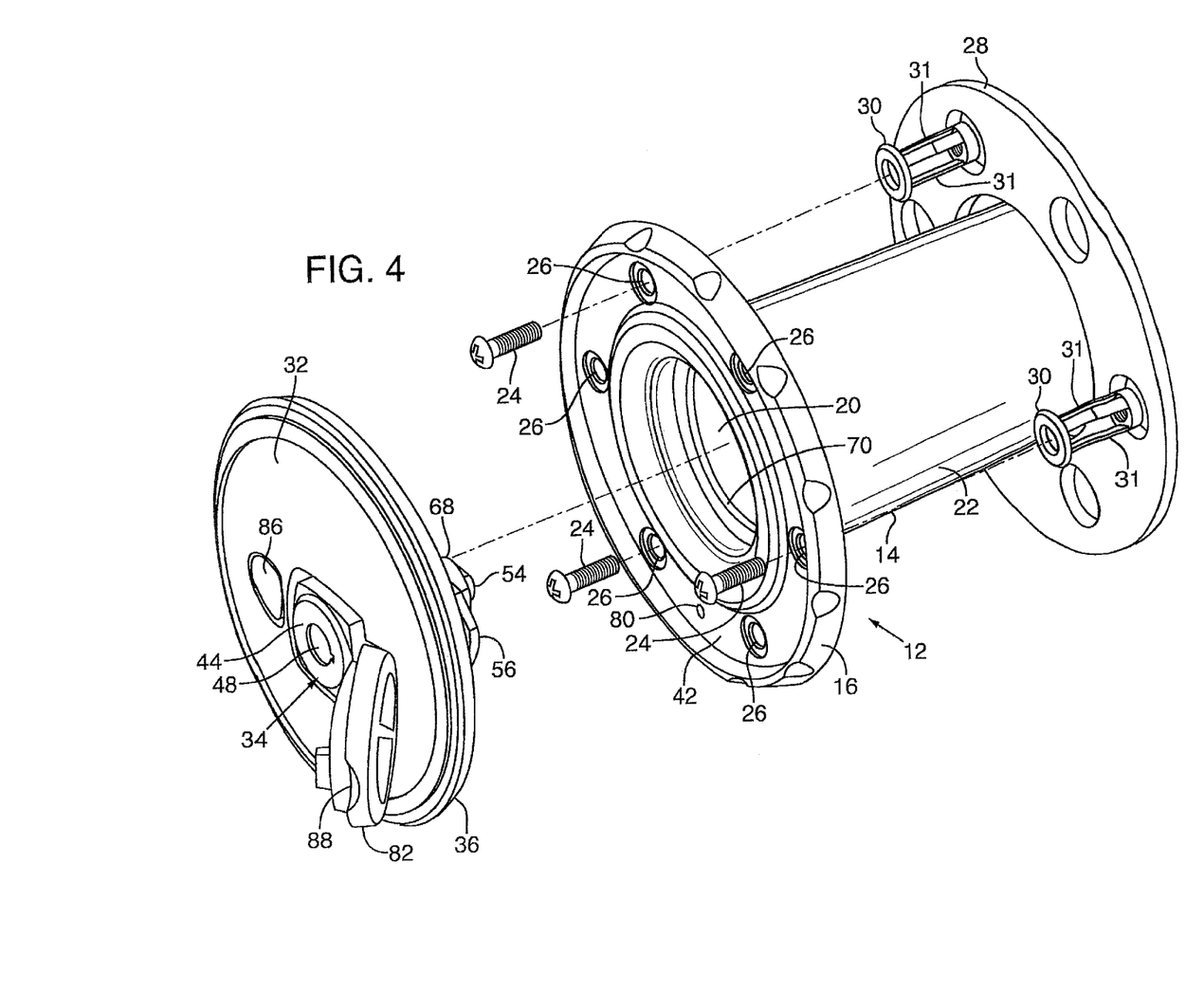
FIG. 4 is a front exploded oblique view of the key container of FIG. 1, also showing a sealing member shaped to fit between the body and the vehicle.
Figure 6:
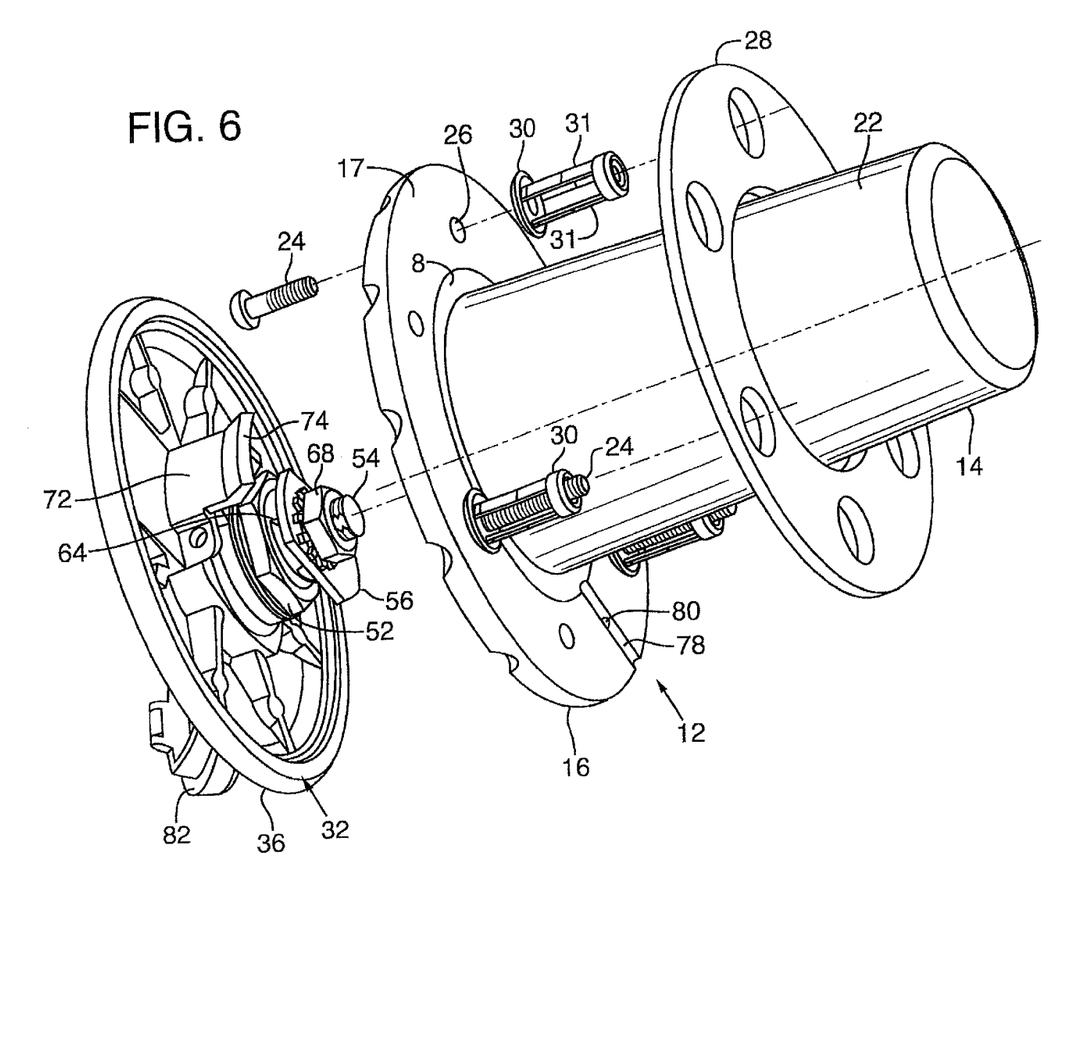
FIG. 6 is a rear exploded oblique view of the key container of FIG. 4.

The storage portion 14 defines an internal chamber 18 that communicates with an access opening 20 defined in the flanged end 16. The chamber 18 is of sufficient capacity for storing keys or other items (not shown). A removable cover 32, which is mounted in a recess 42 defined in the front surface of the flanged end 16, is configured to cover the access opening 20 and thereby restrict access to the chamber 18. As shown in FIGS. 4 and 6, the cover 32 can be removed from the flanged end 16 to open the key container 10 for accessing the items stored in the chamber 18.

An elastomeric sealing member is preferably disposed between the cover 32 and the flanged end 16 to prevent the ingress of foreign substances, such as dirt and moisture. In the illustrated embodiment, the sealing member is an elastomeric annular gasket 36 having a generally U-shaped cross-sectional area configured to fit around the periphery of the cover 32.

A locking mechanism 34 is provided to keep the cover 32 closed and locked to the body 12. Further details of the construction and operation of the locking mechanism 34 are described below.

To install the key container 10 on the vehicle, the opening 4 for receiving the storage portion 14 is cut in the side panel 6. The diameter of the opening 4 can be made slightly smaller than the outer diameter of the storage portion 14 adjacent the flanged end 16 so that the storage portion 14 creates a friction fit with the opening 4 upon insertion. Once inserted into the opening 4, the body 12 of the key container 10 is then fastened to the side panel 6, e.g. with fasteners, such as conventional bolts 24 that are screwed into expandable jacknuts 30 (shown in their unexpanded state in FIGS. 4 and 6). The bolts 24 and jacknuts 30 extend through holes 26 defined in the recess 42 of the flanged end 16 and corresponding holes 27 defined in the side panel 6. When the bolts 24 are tightened, the legs 31 of each jacknut 30 expand against the inside surface of the side panel 6 (as shown in FIGS. 2 and 3), thereby securing the body 12 of the key container to the side panel.

As shown in FIG. 3, the cover 32 encloses the exposed end or top head portion of each bolt 24 within the recess 42. Accordingly, when the locking mechanism 34 is actuated to lock the cover 32 to the body 12, only authorized users can gain access to the bolts 24 in order to remove the key container 10 from the vehicle. An elastomeric sealing member 28 having corresponding holes for receiving bolts 24 is preferably positioned between the rear surface 17 of the flanged end 16 and the outside surface of the side panel 6. The sealing member 28 may be made of any suitable material, such as Poron®.

Figures 5, 7:
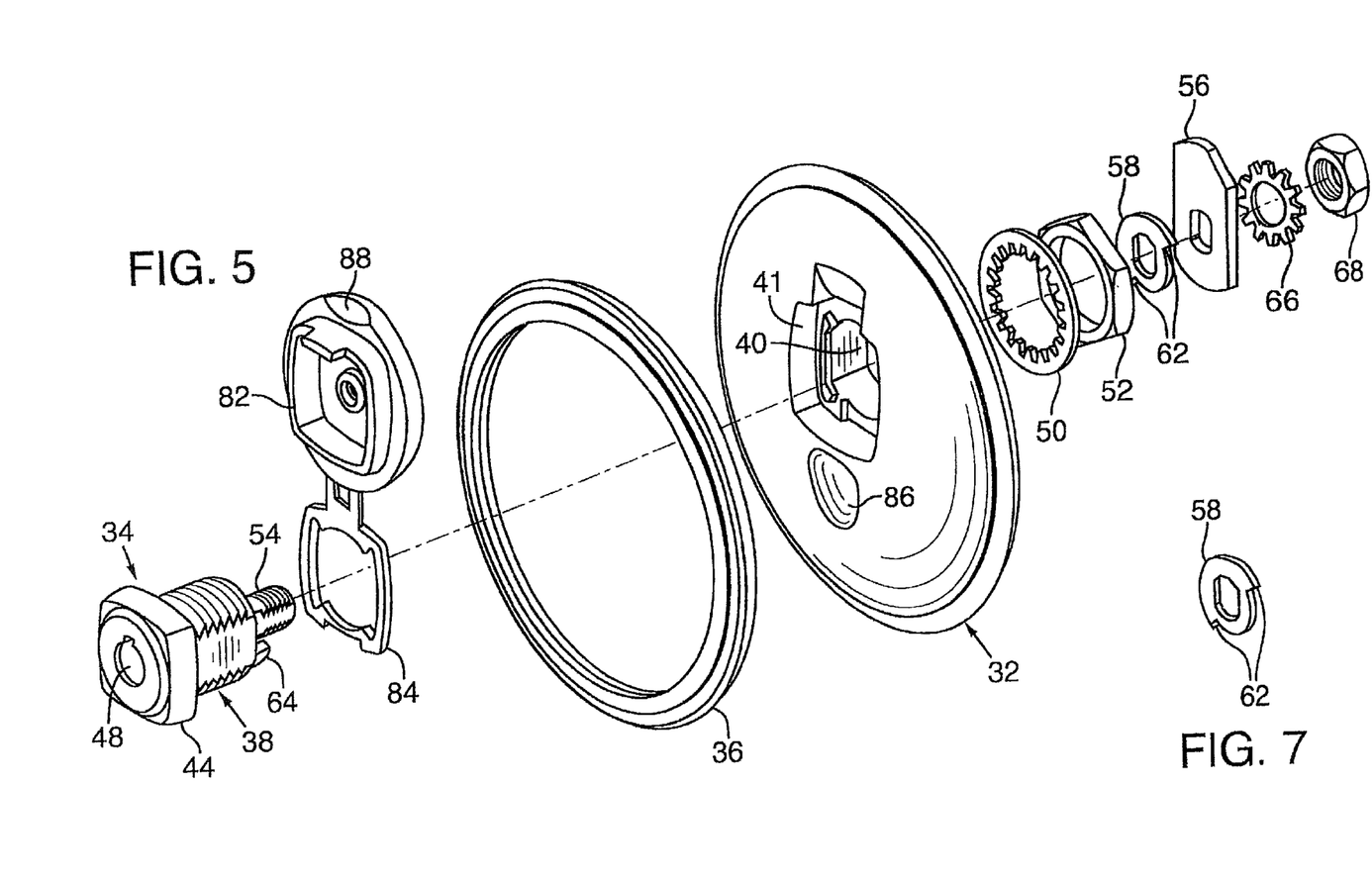
FIG. 5 is a front exploded oblique view of the locking mechanism and cover of the key container of FIG. 1.
FIG. 7 is a side view of the stop of the locking mechanism of FIG. 5.

As best shown in FIG. 5, the cover 32 defines a recess 41 and a bore 40 extending therethrough for receiving the locking mechanism 34. The locking mechanism 34 preferably comprises a conventional key actuated lock assembly having a housing 38 that extends through bore 40 (as shown in FIG. 3). The housing 38 has a forward flanged end 44 that nests within the recess 41 and is retained in the bore 40 with a washer 50 and nut 52 disposed on its rearward end. The interior of the housing 38 is sized to receive a lock core 54 that is rotatable relative thereto. The lock core 54 may be coupled to the housing 38 in any conventional manner so as to prevent its removal in the axial direction. A keyway 48 for receiving a key (not shown) is defined in the forward end of the lock core 54. To prevent easy duplication of the key, the keyway 48 is preferably configured to receive a tubular type key having internal fins. To actuate the locking mechanism 34, the key is inserted into the keyway 48 and rotated between a locked position or condition wherein the cover 32 is locked to the body 12 and an unlocked position or condition wherein the cover 32 is removable from the body 12.

A flexible hinge piece 84, which is disposed on the housing 38 adjacent the flanged end 44, is connected to a foldable cap 82 that fits over the flanged end 44 to protect the keyway 48 from the elements (as best shown in FIG. 3). A detent 86 defined in the cover 32 and a corresponding detent 88 defined in the cap 82 are provided to facilitate the removal of the cap 82 when access to the keyway 48 is required.

As best shown in FIG. 3, the lock core 54 has a locking axis A that is parallel to but laterally offset from a central axis C of the key container 10. This feature is significant as will be explained below. A stop 58 and a radially projecting lock engaging member 56 are disposed on a rearward end portion of the lock core 54 and secured with a washer 66 and nut 68 so that rotation of the lock core 54 also causes rotation of the stop 58 and lock engaging member 56. When the key is turned in the keyway 48, the lock core 54 is rotatable relative to the housing 38 about the locking axis A between the locked position wherein the lock engaging member 56 engages a portion of the body 12 and the unlocked position wherein the lock engaging member 56 disengages from the body 12. The key may be inserted and removed from the keyway 48 when the lock core 54 is in the locked position. When the key rotates the lock core 54 to the unlocked position, however, the key cannot be removed from the keyway 48.

A circumferentially extending notch having a pair of flat edges 62 is defined in the stop 58 to limit the rotational movement of the lock core 54 (as shown in FIGS. 5 and 7). An ear 64 projecting from the rearward end of the housing 38 is positioned in the notch so that rotation of the stop 58 (and thereby the lock core 54) is restricted by the flat edges 62 of the stop 58 (FIG. 5 and 7). In the illustrated embodiment, the ear 64 and stop 58 are configured so as to limit the rotation of the lock core to about 90 degrees between the locked and unlocked positions.

The locking mechanism 34 cooperates with the body 12 to lock and unlock the cover 32 in the following manner.

When the locking mechanism 34 is in the locked position (as shown in FIG. 3), the outer end of the lock engaging member 56 engages an annular lip 70 formed on the inside surface of the chamber 18 adjacent the access opening 20. An axially extending foot 72, which is connected to the back of the cover 32, has an upwardly curved end portion 74 that engages the lip 70 at a position 180 degrees from the lock engaging member 56 to prevent removal of the cover 32. As previously mentioned, the locking axis A is offset from the central axis C. Thus, when the lock core 54 is rotated about the locking axis A with the key to the unlocked position, the lock engaging member 56 clears the lip 70 so that the cover 32 may be removed from the body 12 to access the items stored in the chamber 18. Similarly, the cover 32 may also be placed back in the recess 42 of the flanged end 16 so as to close the key container 10 while the locking mechanism 34 is in the unlocked position. The cover 32 may then be locked to the body 12 by turning the key, which rotates the lock core 54 to the locked position and causes the lock engaging member 56 to reengage the lip 70 at a point diametrically opposite the foot 72.

As should be appreciated from the drawings, the foot 72 and the lock engaging member 56 may engage the lip 70 at any two diametrically opposite positions along the circumference of the lip 70. Accordingly, the cover 32 may be positioned at any orientation about the central axis C when it is placed in the recess 42 and then locked to the body 12. The key container 10 of the present invention is therefore easier to operate than prior art key containers because the locking mechanism 34/lip 70 obviate the need to align the cover with the body at a particular orientation to close and lock the key container. This feature saves considerable time for individuals, e.g., fleet managers, service technicians, who must repeatedly access a number of key containers within the fleet.

Referring again to FIG. 3, a drain hole 76 can be provided in the storage portion 14 adjacent the lip 70. The drain hole 76 is in communication with a drain path 78 defined in the rear surface 17 of the flanged end 16 to allow any moisture that may have collected within the chamber 18 to escape therefrom. An additional drain hole 80 may be defined in the flanged end 16 to provide means for draining any moisture that may have collected in the recess 42 of the flanged end 16.

The storage portion 14, the flanged end 16, and the cover 32 are preferably formed of a cast material, such as zinc, and provided with a suitable finish for weather resistance. In a particular embodiment, the storage portion 14 has a length of approximately 3.75 inches, an outer diameter of approximately 2 inches adjacent the flanged end 16, and an outer diameter of approximately 1.75 inches at its other end. The opening in the side panel 6 that receives the storage portion has a diameter of approximately 2 inches. The diameters of the flanged end 16 and cover 32 are approximately 3.75 and 3.5 inches, respectively.

Figure 8:
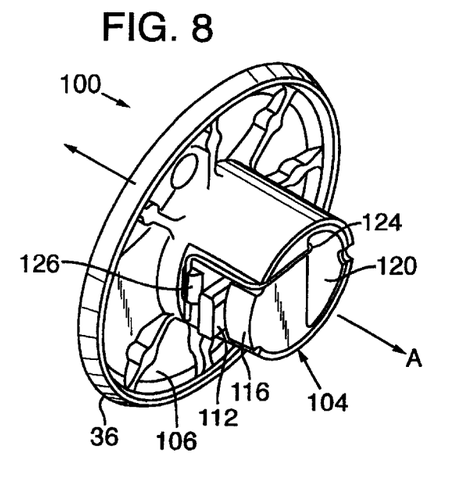
FIG. 8 is a rear oblique view of the cover and locking mechanism of a key container according to another embodiment of the invention.
Figure 9:
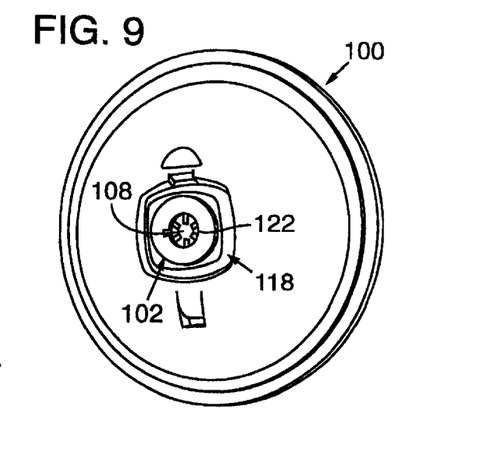
FIG. 9 is a front oblique view of the cover and locking mechanism of FIG. 8.
Figure 10:
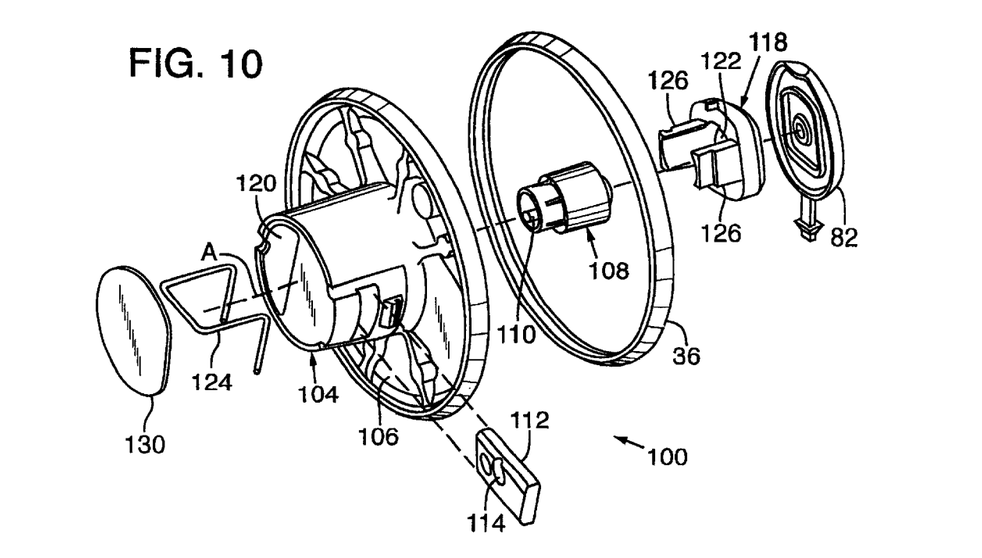
FIG. 10 is a rear exploded oblique view of the cover and locking mechanism of FIG.8.

Referring to FIGS. 8–10, there is shown a cover 100 and a locking mechanism 102 according to another embodiment of the invention. It should be appreciated that the cover 100 and locking mechanism 102 can be used in conjunction with the body 12 of the key container 10 shown in FIGS. 2, 3, 4 and 6. Thus, the description of the embodiment shown in FIGS. 8–10 will proceed with reference to the body 12 of the key container 10 illustrated in FIGS. 2, 3, 4 and 6. The cover 100 has a body engaging portion 104 extending in a generally axial direction from the rear or interior surface 106 of the cover 100 (as shown in FIGS. 8 and 10). The body engaging portion 104 is sized to extend through the access opening 20 and into the chamber 18 of the body 12. In the illustrated from, the body engaging portion 104 has a generally cylindrical cross section to correspond to the shape of the internal chamber 18.

FIG. 9 shows the cover 100 from the front side with the locking mechanism 102 exposed. Of course, the cover 100 can be fitted with the foldable cap 82 or the like to cover the locking mechanism 102 when it is not in use.

The locking mechanism 102 comprises a lock core 108 (FIG. 10) which extends through the cover 100 and body engaging portion 104. The lock core 108 is operatively connected to a reciprocating lock engaging member 112, such as by a projection 110 extending in the axial direction from one end of the lock core 108 and positioned in a slot 114 defined in the lock engaging member 112 (as best shown in FIG. 10). The lock core 108 defines a locking axis A parallel to the central axis C of the body 12 and about which the lock core 108 rotates. Although it is not required, the locking axis A may be laterally offset from the central axis C of the body 12.

When actuated by a key (not shown), the lock core 108 is rotatable relative to the cover 100 about the locking axis A between a locked position and an unlocked position. The lock engaging member 112 is operable to reciprocate in a direction perpendicular to the central axis C (and the locking axis A) upon rotation of the lock core 108 to engage a portion of the body 12, such as lip 70, and to disengage the body 12 when moved to the unlocked position. As shown in FIG. 8, the lock engaging member 112 extends through the side surface 116 of the body engaging portion 104. A bore 120 is defined in the body engaging portion 104 to receive the lock engaging member 112 when it is retracted to its unlocked position. A plate or cover 130 (FIG. 10) may be mounted to the rear end of the body engaging portion 104 to prevent items stored in the chamber from entering the bore 120. If an unauthorized user attempts to pry the cover 100 from the body 12 when the lock engaging member 112 is engaged with a portion of the body 12 (i.e., the locking mechanism 102 is in the locked position), the body engaging portion 104 will angle slightly and contact a portion of the body to prevent removal of the cover 100.

As shown in FIG. 9, a lock core cover 118 is positioned over the lock core 108 and fit flush with the cover to prevent removal of the lock core 108 from the front side of the cover. The cover 118 has an opening 122 to permit insertion of a key into the keyway of the lock core 108. A spring clip 124 engages leg portions 126 of the cover 118 to secure the cover 118 to the body engaging portion 104 (FIGS. 8 and 10).

The body engaging portion 104 and the chamber 18/opening 20 desirably are sized such that the body engaging portion has a clearance fit with the opening in the chamber when the cover 100 is engaged with the body 12. In the context of the present description, "clearance fit" means that the there is sufficient clearance between the outer diameter of the body engaging portion 104 and the inner diameter of the chamber 18 to permit insertion of the body engaging portion 104 into the chamber 18 when the lock engaging member 112 is in the unlocked position and prevent removal of the cover 100 (e.g., by prying it out from one side) when the lock engaging member 112 is in the locked position. In a working embodiment, there is about ⅛ inch clearance between the outer diameter of the body engaging portion 104 and the inner diameter of the chamber 18.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. A key container, comprising:
   a body having a flanged end with an access opening and a storage portion defining an internal chamber in communication with the access opening, the flanged end having at least one hole for receiving a fastener; and
   a removable cover configured to engage the flanged end of the body and to cover the access opening and the at least one hole when the cover is coupled to the flanged end.

2. The key container of claim 1 further comprising a locking mechanism for locking the cover to the body.

3. The key container of claim 2 further comprising a cap hingedly connected to the cover for covering the locking mechanism.

4. The key container of claim 2 wherein:
   the locking mechanism includes a lock core extending through the cover; and
   the core has a locking axis about which the lock core is rotatable relative to the cover between a locked condition wherein the locking mechanism engages the body and an unlocked condition wherein the locking mechanism disengages the body.

5. The key container of claim 4 wherein the key container has a central axis and the locking axis is parallel to but laterally offset from the central axis.

6. The key container of claim 5 wherein the locking mechanism includes a lock engaging member projecting radially from one end of the lock core, the lock engaging member being rotatingly operable to engage a portion of the body when the lock core is in the locked condition and to disengage the body when the lock core is in the unlocked condition.

7. The key container of claim 1 wherein the cover has an interior side with a projecting foot, the foot extending in a generally axial direction and having an end shaped to contact the body when the cover is coupled to the body.

8. The key container of claim 7 wherein an interior annular lip is formed in the chamber adjacent the flanged end and the projecting foot has an end shaped to engage a portion of the annular lip when the cover is coupled to the body.

9. The key container of claim 6 wherein the cover has an interior side with a projecting foot, the foot extending in a generally axial direction and having an end shaped to contact the body at a position circumferentially spaced from a portion of the body engaged with the lock engaging member when the cover is coupled to the body and the lock core is in the locked condition.

10. The key container of claim 1 wherein the flanged end has at least one drain hole.

11. The key container of claim 1 further comprising a sealing member for mounting between the flanged end and a structure to which the key container can be mounted.

12. The key container of claim 1 further comprising a sealing member having a portion positioned between the flanged end and the cover when the cover is coupled to the body.

13. The key container of claim 12 wherein the sealing member has a generally U-shaped cross-section and is shaped to fit around a periphery of the cover.

14. The key container of claim 1 wherein the storage portion is generally frustoconical in shape having a side surface tapering from the flanged end.

15. A key container, comprising:
   a body having a first end with an access opening and a storage portion defining an internal chamber in communication with the access opening, the body having a central axis that extends through the access opening and the internal chamber; and
   a removable cover having a locking mechanism, the cover being lockable to the body and shaped to cover the access opening, wherein the cover can be locked to the body at a plurality of positions about the central axis.

16. The key container of claim 15 wherein the locking mechanism includes a lock core extending perpendicularly through the cover and defining a locking axis about which the lock core is rotatable relative to the cover between a locked position wherein the locking mechanism engages the body and an unlocked position wherein the locking mechanism disengages the body.

17. The key container of claim 16 wherein the locking axis is parallel to but laterally offset from the central axis.

18. The key container of claim 17 wherein the cover has an interior side with a projecting foot, the foot extending in a generally axial direction and having an end shaped to contact a portion of the body when the cover is placed against the body.

19. The key container of claim 18 wherein the locking mechanism includes a lock engaging member projecting radially from one end of the lock core, the lock engaging member being operable to engage a portion of the body at a point circumferentially spaced from the portion of the body contacting the foot when the lock core is in the locked position and to disengage the body when the cover is placed against the body and the lock core is in the unlocked position.

20. The key container of claim 19 wherein the lock engaging member engages a portion of the body diametrically opposite the portion of the body contacting the foot when the cover is placed against the body and the lock core is in the locked position.

21. The key container of claim 19 wherein an interior lip is formed in the chamber adjacent the first end to receive the foot and the lock engaging member.

22. A key container for mounting to a vehicle, comprising:
   a body having an exposed end portion for mounting to the outside surface of the vehicle and a hidden portion that may be inserted through an opening defined in the vehicle, the exposed end portion defining an access opening in communication with an internal chamber defined in the hidden portion, the end portion defining at least one hole for receiving a fastener for mounting the end portion to the vehicle; and
   a removable cover having a locking mechanism configured to prevent unauthorized personnel from accessing the chamber, the cover configured to cover the access opening and the at least one hole when the cover is placed against the end portion.

23. A method for locking a removable cover to a key container, the key container comprising a body with an access opening and a storage portion, the body defining a central axis that extends through the access opening and the storage portion, the cover being lockable to the body at a plurality of positions about the central axis, the method comprising:
   placing the cover in contact with the body at any position about the central axis; and
   using a key to lock the cover to the body.

24. The method of claim 23 wherein the cover comprises a locking mechanism having a lock core extending perpendicularly through the cover and defining a locking axis about which the lock core is rotatable relative to the cover, and wherein the act of using a key to lock the cover to the body includes rotating the lock core with the key to engage the lock mechanism with the body.

25. The method of claim 24 wherein the cover has an interior side with a projecting foot extending in a generally axial direction and having an end shaped to contact a portion of the body and wherein the locking mechanism is circumferentially spaced from the foot, and wherein the act of placing the cover in contact with the body includes engaging the end of the foot with the body.

26. A key container comprising:
a body having a first end with an access opening and a storage portion defining an internal chamber in communication with the access opening, the first end having at least one fastener with an exposed end; and
a removable cover configured to cover the access opening, thereby preventing access into the chamber through the access opening, the cover also configured to cover the exposed end of the fastener when the cover is coupled to the first end.

27. The key container of claim 26 wherein the first end is formed with a hole, the at least one fastener is received in the hole and the cover is configured to cover the hole when the cover is coupled to the first end.

28. A key container, comprising:
a body having a first end with an access opening and a storage portion defining an internal chamber in communication with the access opening, the body having a central axis that extends through the access opening and the internal chamber;
a removable cover having an interior side with a body engaging portion, the body engaging portion extending in a generally axial direction and being sized to extend through the opening and into the internal chamber; and
the cover having a locking mechanism, the cover being lockable to the body and shaped to cover the access opening, wherein the cover can be locked to the body at a plurality of positions about the central axis.

29. The key container of claim 28 wherein:
the locking mechanism has a lock core extending through the cover and the body engaging portion and a reciprocating lock engaging member operatively connected to the lock core, the lock core having a locking axis about which the lock core is rotatable relative to the cover between a locked position and an unlocked position, the lock engaging member being operable to reciprocate in a direction perpendicular to the locking axis upon rotation of the lock core to engage a portion of the body in the locked position and disengage the body in the unlocked position.

30. The key container of claim 29 wherein the locking axis is parallel to but laterally offset from the central axis.

31. The key container of claim 29 wherein the body engaging portion has a side surface and the lock engaging member extends through the side surface of the body engaging portion when the lock core is rotated to the locked position.

32. The key container of claim 28 wherein the body engaging portion and the access opening are sized such that the body engaging portion has a clearance fit with the opening when the removable cover is engaged with the body.

33. The key container of claim 28 wherein the body engaging portion has a generally cylindrical cross section.

34. The key container of claim 33 wherein the body engaging portion has an outer diameter slightly less than the inside diameter of the chamber.

35. A key container, comprising:
a body having a flanged end with an access opening and a storage portion defining an internal chamber in communication with the access opening, the body having a central axis that extends through the access opening and the storage portion, the storage portion being generally frustoconical in shape having a side surface that tapers from the flanged end;
the flanged end defining a plurality of holes, each hole being sized to receive a fastener for mounting the flanged end to the outside surface of a structure;
the body having an annular lip formed in the chamber;
a removable cover coupleable to the flanged end and shaped to cover the access opening and the holes when coupled to the flanged end, the cover having a foot extending from a side of the cover that faces the access opening and is shaped to engage a portion of the annular lip; and
a locking mechanism attached to the cover, the locking mechanism having a lock core extending perpendicularly through the cover and a lock engaging member connected to the lock core and projecting radially therefrom, the lock core defining a locking axis parallel to and offset from the central axis of the key container, the lock core being rotatable about the locking axis between a locked condition wherein the lock engaging mechanism engages a portion of the lip at a position circumferentially spaced from the portion of the lip engaging the foot and an unlocked condition wherein the lock engaging mechanism disengages the tip cover is coupled to the first end.

\* \* \* \* \*

UNITED STATES PATENT AND TRADEMARK OFFICE
CERTIFICATE OF CORRECTION

PATENT NO. : 6,588,638 B1  Page 1 of 1
APPLICATION NO. : 09/776327
DATED : July 8, 2003
INVENTOR(S) : Luebeck et al.

It is certified that error appears in the above-identified patent and that said Letters Patent is hereby corrected as shown below:

Column 10, line 51, "tip cover is coupled to the first end." should read --lip.--

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO.        : 6,588,638 B1
APPLICATION NO. : 09/776237
DATED             : July 8, 2003
INVENTOR(S)       : Luebeck et al.

It is certified that error appears in the above-identified patent and that said Letters Patent is hereby corrected as shown below:

Column 10, line 51, "tip cover is coupled to the first end." should read --lip.--

This certificate supersedes Certificate of Correction issued August 29, 2006.

Signed and Sealed this

Tenth Day of October, 2006

JON W. DUDAS
*Director of the United States Patent and Trademark Office*